(12) United States Patent
Kustosch

(10) Patent No.: US 7,200,480 B2
(45) Date of Patent: Apr. 3, 2007

(54) METHOD AND DEVICE FOR CONTROLLING THE TRAVELING SPEED OF A VEHICLE

(75) Inventor: Mario Kustosch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 10/501,350

(22) PCT Filed: Oct. 7, 2002

(86) PCT No.: PCT/DE02/03539

§ 371 (c)(1), (2), (4) Date: Jul. 15, 2004

(87) PCT Pub. No.: WO03/059677

PCT Pub. Date: Jul. 24, 2003

(65) Prior Publication Data

US 2005/0055151 A1    Mar. 10, 2005

(30) Foreign Application Priority Data

Jan. 15, 2002 (DE) ............................. 102 01 160

(51) Int. Cl.
G06F 7/00 (2006.01)

(52) U.S. Cl. ...................................................... 701/93

(58) Field of Classification Search .............. 701/93; 123/349

See application file for complete search history.

(56) References Cited

U.S. PATENT DOCUMENTS

| 5,351,776 | A | | 10/1994 | Keller et al. |
| 5,665,026 | A | | 9/1997 | Linden |
| 5,713,428 | A | | 2/1998 | Linden et al. |
| 6,021,370 | A | * | 2/2000 | Bellinger et al. ........... 701/110 |
| 6,188,949 | B1 | | 2/2001 | Hahn et al. |
| 6,208,926 | B1 | | 3/2001 | Wagner et al. |
| 2003/0100405 | A1 | | 5/2003 | Homeyer et al. |

FOREIGN PATENT DOCUMENTS

DE    196 54 769    7/1998

OTHER PUBLICATIONS

"Adaptive Cruise Control, System Aspects and Development Trends," by H. Winner et al, SAE paper 961010, 1996.

* cited by examiner

Primary Examiner—Thu V. Nguyen
(74) Attorney, Agent, or Firm—Walter Ottesen

(57) ABSTRACT

A method and an arrangement for controlling the driving speed of a vehicle are suggested wherein at least two functions are provided which influence the vehicle speed. To avoid conflict between these functions, at least one base value for the input quantities of the functions is formed which is considered in the formation of the input quantities.

8 Claims, 5 Drawing Sheets

METHOD AND DEVICE FOR CONTROLLING THE TRAVELING SPEED OF A VEHICLE

This application is the national stage of PCT/DE 02/03539, filed Oct. 7, 2002, designating the U.S.

FIELD OF THE INVENTION

The invention relates to a method and an arrangement for controlling the driving speed of a vehicle.

BACKGROUND OF THE INVENTION

From EP 507 072 B1 (U.S. Pat. No. 5,351,776), an electronic control system for a vehicle is known wherein a desired acceleration value for the longitudinal movement of the vehicle is derived in dependence upon the driver command and on the desired values from the driver assist systems. The desired acceleration value is adjusted by controlling the drive train or the brake system. Specific inputs for the coordination of several desired acceleration values are not given with these desired acceleration values being determined from independent systems.

A control system for a drive unit is known from U.S. patent application publication 2003/0100405 wherein, starting from transmission output torque values or output desired torque values of different control systems, a resulting desired torque value is generated for the control of the drive unit. The desired torque value is realized via corresponding conversion into actuating quantities of the drive unit.

For example, from DE-A 196 16 732 (U.S. Pat. No. 6,208,926), it is known to convert a desired deceleration value, which originates from the driver by actuating the brake pedal or which originates from a driver assistance system such as a vehicle speed controller, into a desired brake torque which is realized by actuating the braking system of the vehicle.

An adaptive vehicle speed controller (vehicle speed controller with distance measurement) is known from the SAE-Paper No. 96 10 10 "Adaptive Cruise Control, System Aspects and Development Trends", 1996, of Hermann Winner, Stefan Witte, Werner Uhler and Bernd Lichtenberg.

SUMMARY OF THE INVENTION

A parallel operation of speed control functions and speed limiting functions is permitted via the described coordination. In this way, the combination of functions of different type and/or origin (different manufacturer) and/or different products (for example, use of the same speed limiter with an adaptive vehicle speed controller and a usual tempomat) is possible in an advantageous manner.

Also advantageous is the simultaneous use of speed control function and limiting function. The alternative selection of the functions and therefore expensive operator-controlled elements are made unnecessary. In this way, the comfort of use and/or the operating friendliness of the system is increased.

With the described coordination, a modular connection of additional applications is made possible which operate on the vehicle longitudinal movement such as, for example, a curve speed limiting.

BRIEF DESCRIPTION OF THE DRAWINGS

The invention is explained in greater detail with reference to the embodiments shown in the drawing.

DESCRIPTION OF THE PREFERRED EMBODIMENTS OF THE INVENTION

Figure 1:
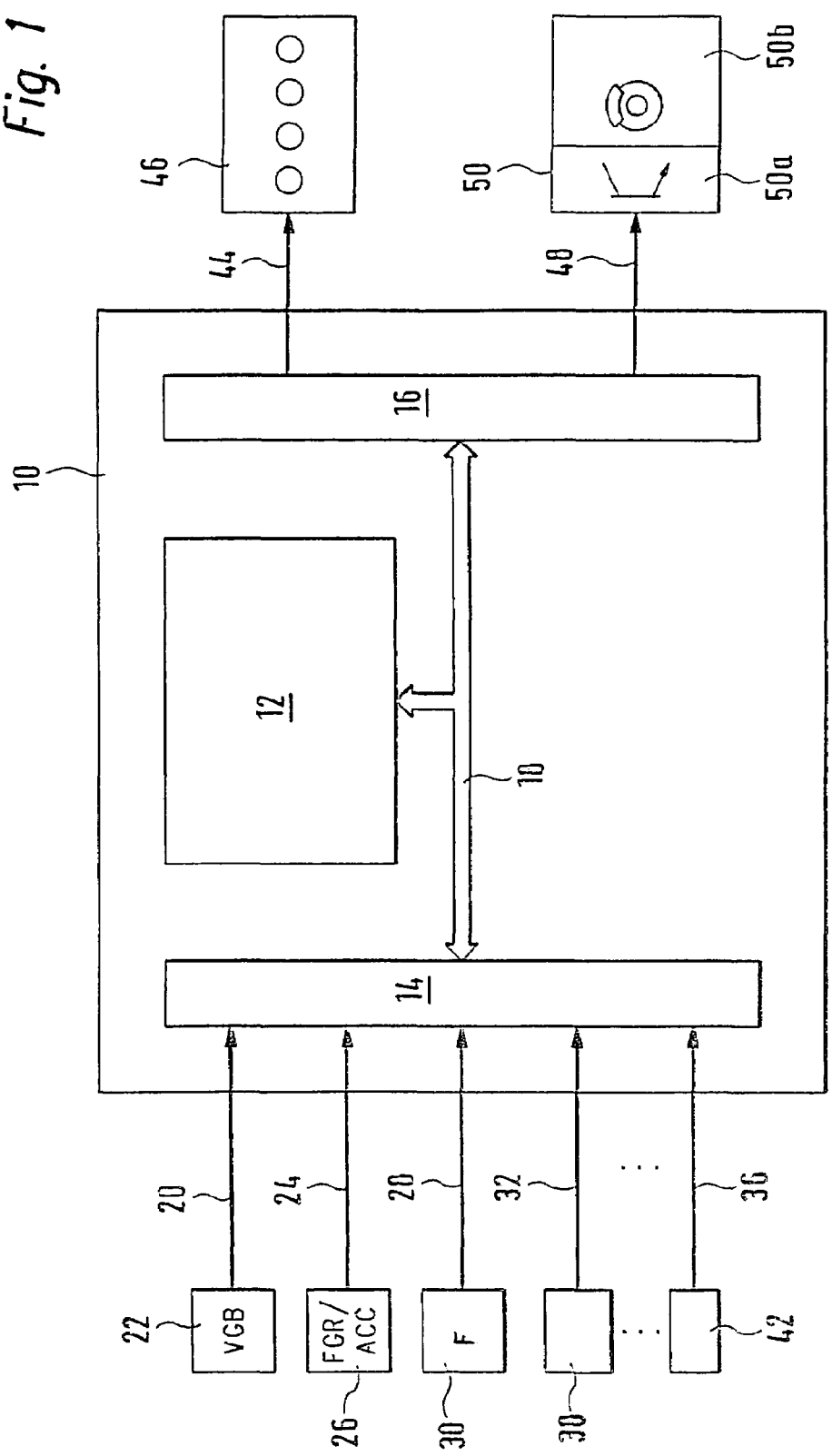
FIG. 1 shows an overview diagram of a control system which permits the below-described measure for conflict-free coexistence of different functions which influence the driving speed.

FIG. 1 shows an electronic control unit 10 which can, depending upon the embodiment, be a control unit for the following: motor control, transmission control, brake control, a central control unit of a vehicle control system or another control unit. In the illustrated preferred embodiment, the control unit 10 is a control unit for controlling the drive motor. The control unit comprises a microcomputer including a memory 12, an input circuit 14 and an output circuit 16. These elements are connected to each other for data exchange by a communication system 18. Input lines are connected to the input circuit 14 and these input lines connect the control unit 10 to other control systems which exercise influence on the longitudinal movement of the vehicle and these input lines are connected to measuring devices for detecting operating variables of the vehicle, the drive unit, the drive train or the brake system. With a view to the preferred embodiment, a first input line 20 connects the control unit 10 to a vehicle speed limiter (VGB) 22 and a second input line 24 connects the control unit 10 to a vehicle speed controller (FGR) or to an adaptive vehicle speed controller (ACC) 26. At least one quantity is supplied to the control unit 10 via an input line 28 from a measuring device 30. This quantity represents the position of an operator-controlled element actuable by the driver. This operator-controlled element is, for example, an accelerator pedal. In addition, input lines 32 to 36 are provided which connect the control unit 10 to measuring devices 38 to 42. These measuring devices detect signals which represent additional operating variables of the vehicle, of the drive, or of the brake system. As an example, the following are mentioned here: engine rpm, engine temperature, the status of ancillary consumers which do not contribute to the drive of the vehicle, the transmission ratio in the drive train, et cetera.

Output lines 44 lead away from the output circuit 16 of the control imit 10. Via these output lines 44, the drive unit 46 of the vehicle is controlled by means of actuating variables for power parameters. Furthermore, a connection to a braking control system 50 is provided via a connecting line 48. A deceleration command is outputted via this connection to the control unit 50a of the brake system and this control unit 50a actuates the brake system 50b of the vehicle. Such a brake control system 50 is, for example, a known electro-hydraulic brake system.

In the embodiment shown, the hereinafter described measures for the conflict-free coexistence of the speed control systems are part of the control unit 10 which makes available actuating variables for controlling the drive unit 46 of the vehicle. In other embodiments, this coordinator is part of the control unit 50a of the brake system. A corresponding control signal is then outputted to a control unit for controlling the drive unit of the vehicle. In other embodiments, the control unit 10 is a central control unit or a control unit of an assistance system which determines the actuating signals for the brake control systems or the drive control systems. The drive unit 46 is an internal combustion engine or an electric motor depending upon the embodiment.

In addition, in FIG. 1, the vehicle speed limiter 22 and the adaptive vehicle speed controller 26 are shown as separate control units which include their own microcomputers for carrying Out their functions. In other embodiments, the described functions are programs of the microcomputer 12. In this case, only actuating signals of the driver and measuring signals with respect to vehicle speed and distance are transmitted via the input lines; whereas, the acceleration desired values of these control systems are present internally in the microcomputer 12.

The control unit 10 receives a quantity via the input line 28 which transmits the position of an operator-controlled element actuable by the driver, for example, an accelerator pedal. From the above, as is explained, for example, in the initially-mentioned state of the art, a desired torque value is derived which is converted into the actuating quantities for controlling the drive unit by logically coupling the desired torque value with other desired torque values. The adaptive vehicle speed controller 26 generates acceleration desired signals. An example for such a procedure is known from the state of the art mentioned initially herein. The adaptive vehicle speed controller 26 transmits the desired acceleration to the control unit 10. The vehicle speed limiter 22 shown by way of example forms corresponding desired signals.

As described above, in addition to functions for the control of a pregiven speed (vehicle speed control or tempomat FGR) or the distance (for example, adaptive cruise control, ACC), also functions for limiting to a pregiven upper speed threshold (speed limiting functions) are increasingly demanded. Application examples for such limiting functions are the limiting to an upper speed, which is pregiven by the driver, the limiting of the speed in travel through a curve or when detecting an exceeding of the permissible maximum weight, for pressure loss in tires, et cetera. Conflicts can occur when a speed controller and a speed limiter are active at the same time. If, for example, the speed controller limits to 80 km/h but a speed limit of 50 km/h is present, the two controllers would operate against each other and possibly available integrators would assume large values. In this way, the driving comfort would be affected, for example, from vibrations.

Figure 2:
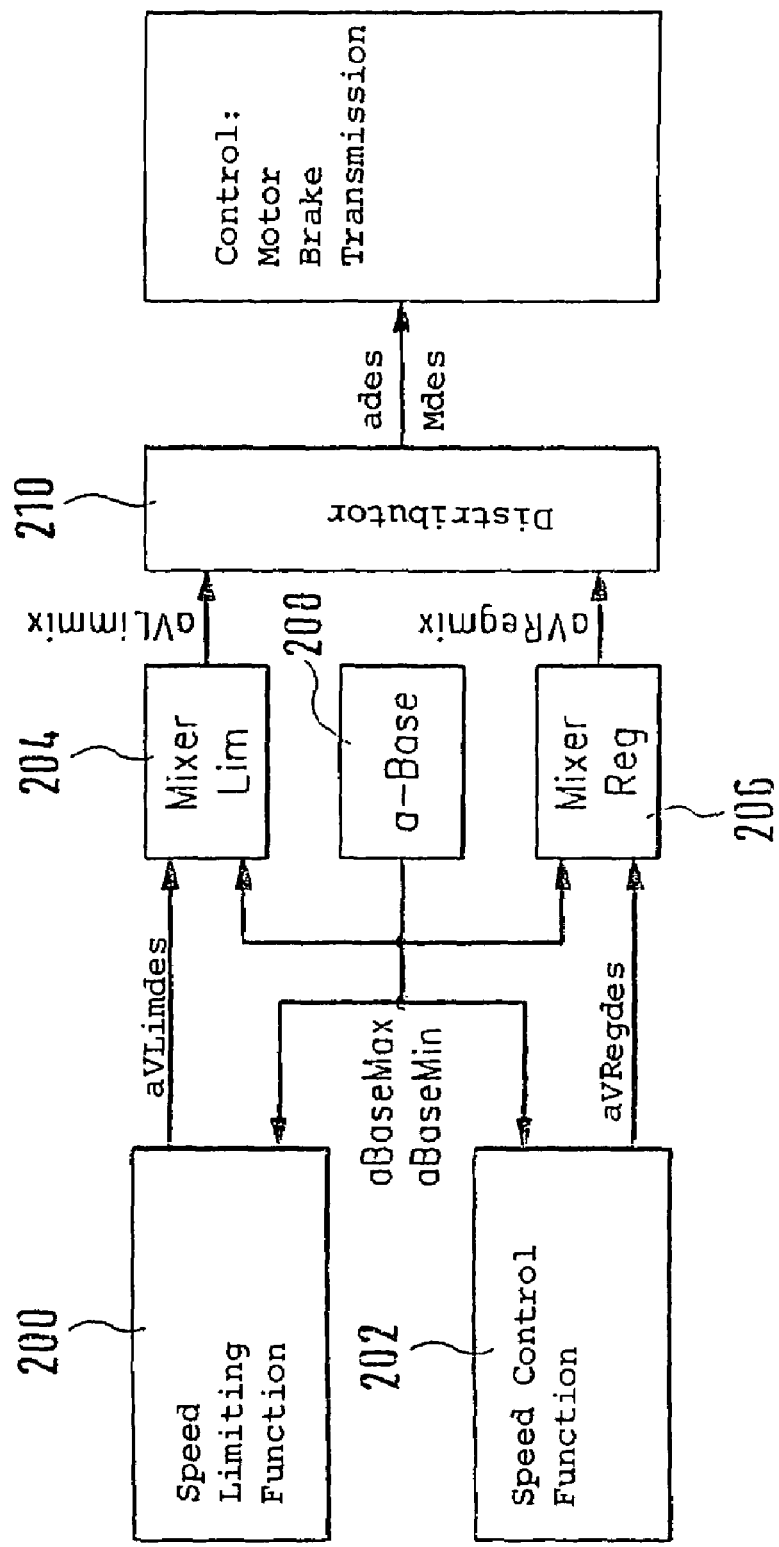
In FIGS. 2 to 5, and based on diagrams, a preferred embodiment for measures for the conflict-free coexistence of several vehicle speed control functions is shown.

The flowchart shown in FIG. 2 represents the program of a microcomputer of one of the above-mentioned control units. The flowchart shows measures which effectively prevent the above-outlined conflict. As a speed control function, a function is understood in this context which requests the propulsion of the vehicle in the longitudinal direction. The propulsion is influenced positively as well as negatively. Examples of this are adaptive vehicle speed controllers, tempomats as well as stop-and-roll controllers. Speed limiting functions are functions which request a limiting of the propulsion in the longitudinal direction of the vehicle and therefore influence this propulsion only negatively. Examples are the vehicle speed limiters with input from the driver, speed limiting in a curve, et cetera.

Figure 6:
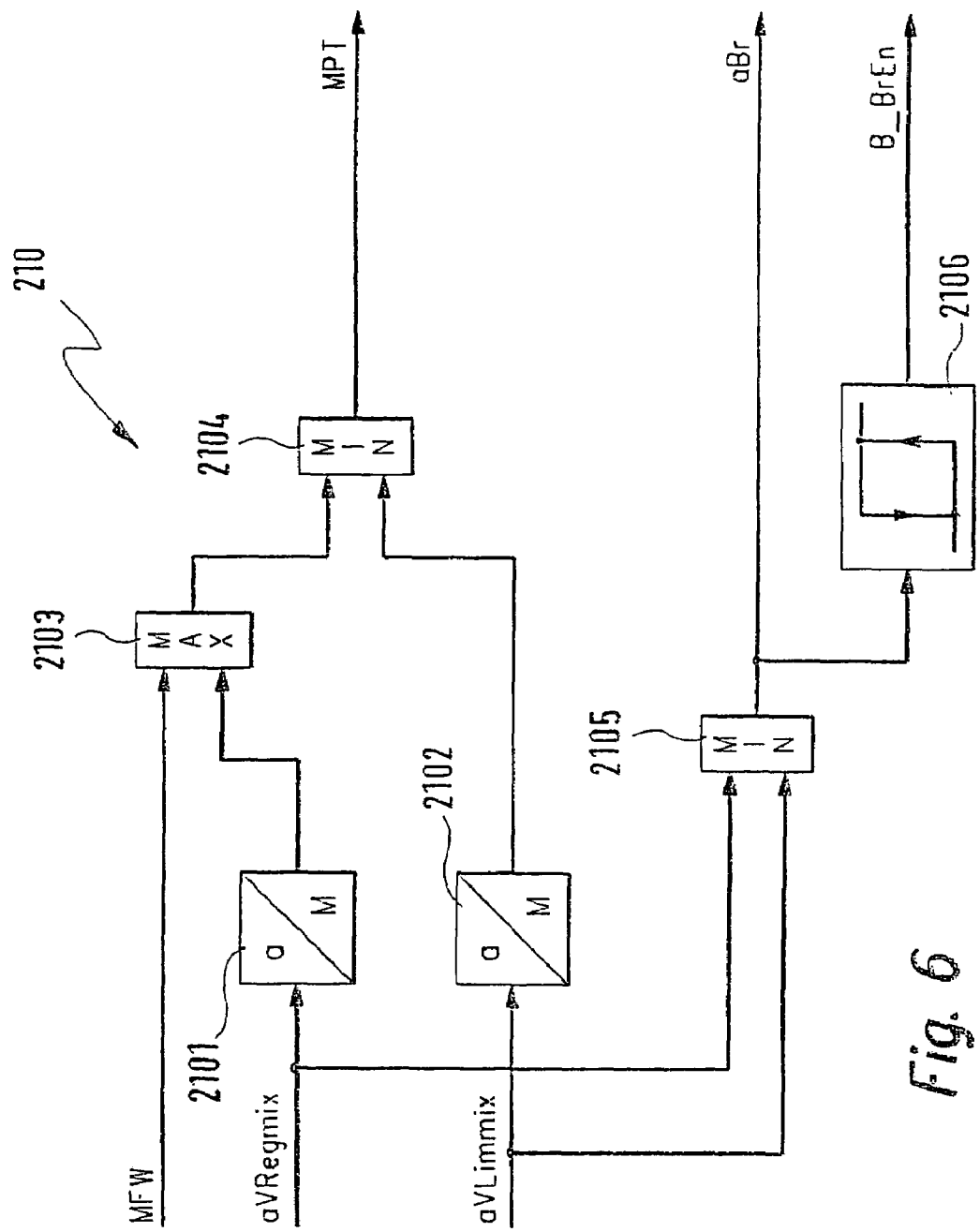
FIG. 6 shows a flowchart of a preferred embodiment of a desired value distributor.

In the flowchart of FIG. 2, a speed limiting function 200 as well as a speed control function 202 are shown. The configurations of functions of this kind, are, for example, known from the state of the art referred to initially herein. The functions develop at least one of the above-mentioned effects and in some embodiments, several of the effects are developed (for example, the limit function can include a curve limiting, a pressure loss limiting and a limiting pregiven by the driver). In correspondence to the above-mentioned state of the art, the particular functions form actuating quantities aVLimdes and/or aVRegdes which the functions output for further processing. In the preferred embodiment, these quantities are desired values for the acceleration and/or deceleration of the vehicle. In other embodiments, these desired quantities are desired torque quantities, et cetera. The actuating quantities are transmitted to mixers (204, 206). respectively, assigned to the respective function. The mixer (LIM) 204 is responsible for the speed limiting function and the mixer (REG) 206 is responsible for the speed control function. The mixers have the task to limit the corresponding desired value (acceleration command). This takes place in dependence upon the base values aBase formed in 208. The formation of these values is described below in detail as is the operation of the mixer. The result of the limiting by the mixers is, possibly, limited desired values. In the case of the speed limiting function, these desired values are designated as aVLimmix as output quantities of the mixer 204 and, in the case of the speed control function, these desired values are identified as aVRegmix as output quantities of the mixer 206. These desired values, which are limited as may be required, are then coordinated in a distributor 210. The distributor makes a selection from these supplied acceleration command values and forms one or several propulsion desired values des which is/are outputted to the corresponding control functions for motor, brake and/or transmission. A preferred embodiment of one such distributor is shown in FIG. 6.

In 208, the acceleration base values are formed. In the preferred embodiment, a first base value aBaseMax is formed which is that value which a desired acceleration must at least exceed so that an actual positive acceleration of the vehicle occurs; whereas, a value aBaseMin is determined as a second value which is that value which a desired acceleration must at least drop below so that a negative acceleration of the vehicle occurs. These base values are transmitted to the mixers 204 and 206 as well as to the speed control functions and/or speed limiting functions. The base values satisfy several functions. On the one hand, the base values serve the speed control functions and the limiting functions as index quantities for limiting the actuating variables, index quantities for integrators and/or for initialization. Accordingly, the actuating quantities are, for example, limited to the particular base value because they only develop an effect for larger values and the integrators are set to this base value.

Furthermore, the base values prevent exceeding physically impossible ranges, for example, the maximum motor torque or maximum brake pressure.

As a third effect, the base values function as hysteresis values for a jolt limiting and therefore serve the driving comfort. As shown in FIG. 2, the base values are transmitted to the driving functions. The driving functions use the base values in order to carry out a limiting of their desired values aVRegMix according to FIG. 3 and aVLimMix according to FIG. 4. In this way, exceeding the base values or dropping below the base values is only permitted by a pregiven amount. This amount is applicable and so selected that no unpleasant jumps in the desired value signals occur.

The base values are pregiven and are especially dependent upon the actual acceleration or deceleration of the vehicle. In the preferred embodiment, the base values are derived from characteristic lines.

In a preferred embodiment, the base values are determined as follows. If, as a condition precedent, a speed control function is active, aBaseMax is computed on the basis of the old acceleration desired value avRegmix(n-1) and the instantaneous vehicle actual acceleration aBaseAct. As a rule, aBaseMax corresponds to the desired value with a positive gradient of the desired value and corresponds to the actual acceleration value with a negative gradient. Here, it is to be noted that aBaseMax does not exceed the instantaneous acceleration value by more than an applicable value (for example, −0.7 m/sec). In this way, it is prevented that aBaseMax moves too far from the actual value by being tied to the desired value.

In the same manner, aBaseMin is computed on the basis of the old acceleration desired value and the instantaneous acceleration value. As a rule, aBaseMin corresponds to the desired value with a negative gradient of the desired value and corresponds to the actual acceleration value with a positive gradient. Here, it is to be noted that aBaseMin does not drop below the instantaneous acceleration value by more than an applicable value (for example, 0.7 m/sec). In this way, it is prevented that aBaseMin moves too far from the actual value by being tied to the old desired value.

Figure 3:
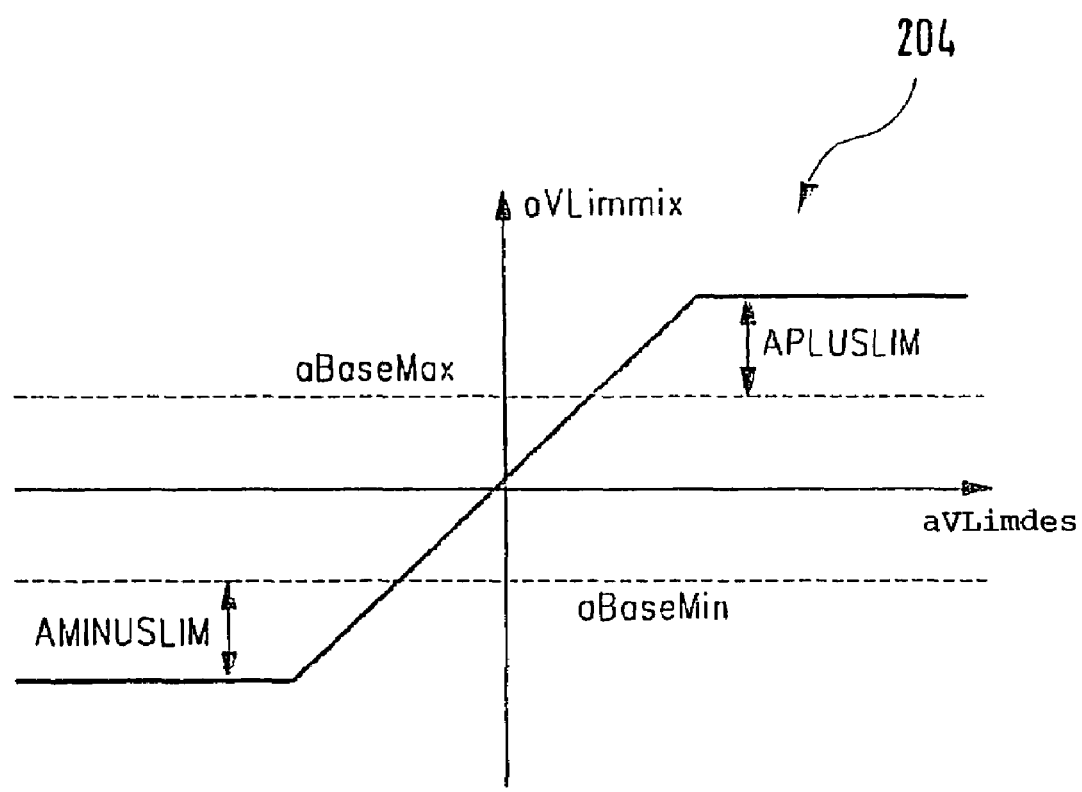

In FIG. 3, the operation of the mixer 204 is described based on a diagram. FIG. 3 shows a characteristic line which functions to convert the supplied desired value aVLimdes into the limited desired value aVLimMix. The output quantity aVLimMix is plotted as a function of the input quantity aVLimdes. The characteristic line describes essentially an original straight line which is limited. The upper limit line is formed by the value (aBaseMax+aPlusLim) and the lower limit line is formed by (aBaseMin−aMinusLim). Here, the quantities aPlusLim and aMinusLim are fixed pregiven quantities. In this way, a characteristic line arises which limits the acceleration command above a specific acceleration command to a fixed maximum value or minimum value. A positive change as well as a negative change of the output quantity aVLimMix is possible at any time outside of the limit values. A change of the desired quantity beyond the base values is likewise possible at any time.

Figure 4:
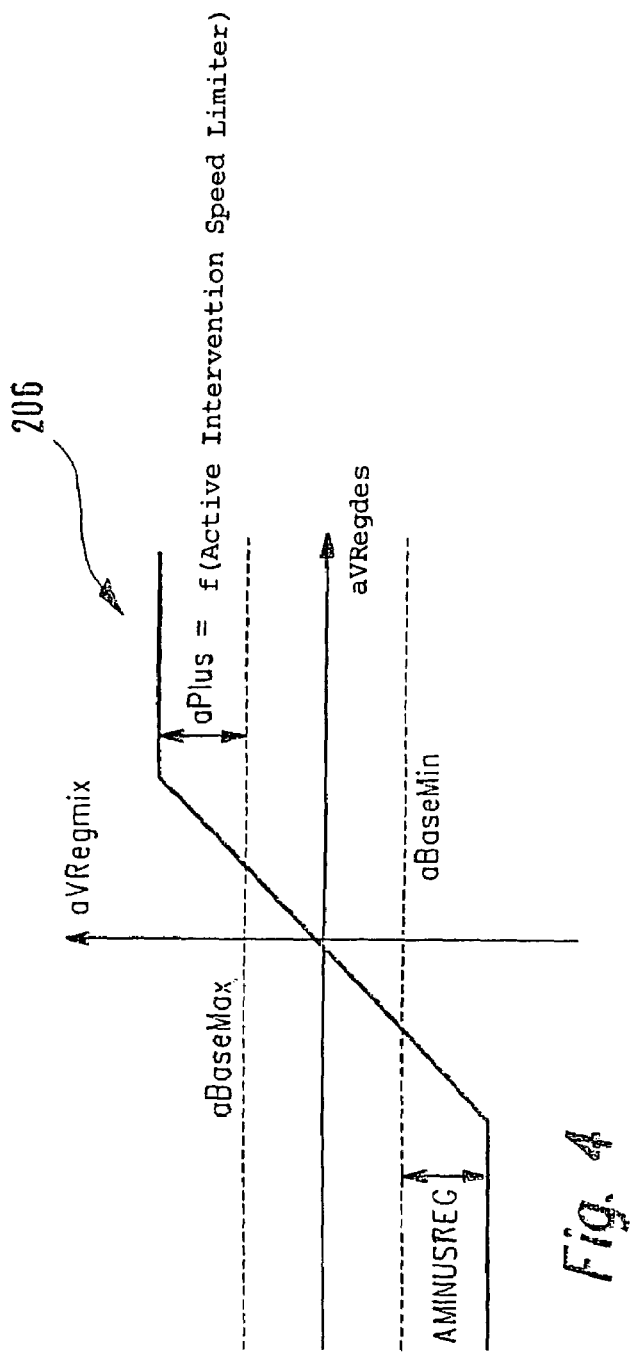

FIG. 4 shows an embodiment for the mixer 206. This mixer 206 also defines a limit characteristic line, preferably an original straight line. Here too, the output quantity aVRegMix is plotted as a function of the input quantity aVRegdes. An input quantity of the mixer 206 is the desired quantity aVRegdes. The upper limit quantity is formed by the base value aBaseMax plus a quantity aPlus and the lower limit quantity is formed by the base value aBaseMin from which a fixedly pregiven value aMinusReg is subtracted. The quantity aPlus is changeable. The quantity aPlus is dependent upon whether an active intervention of the driving speed limiter is present. An active intervention of the drive speed limiter is always then given when the vehicle is decelerated under its action or when other input quantities, for example, from the accelerator pedal are limited thereby. For an active intervention by the driving speed limiter, the upper limit is pregiven by aBaseMax. In this case, the speed control function can thereby not contribute to a positive acceleration change. In this way, it is prevented that the speed control function operates against the driving speed limiter. A negative acceleration change via the speed control function is non-critical and therefore is possible at any time. The mixer 206 therefore forms a type of valve which limits the acceleration command of the speed controller upwardly for an active intervention by the driving speed limiter.

Figure 5:
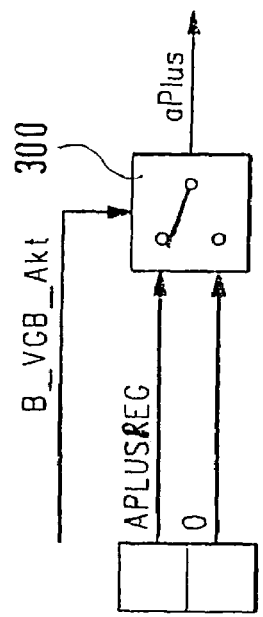

The formation of the factor aPlus is sketched with respect to the flowchart of FIG. 5. The value aPlus is an output quantity of a switch element 300. The switch element 300 is in the position shown for a non-active intervention of the limiter. This means that the fixed pregiven quantity aPlusReg is transmitted as aplus-value. For an active intervention of the speed limiter (B_VGB_Akt=1), the switch element 300 switches into the position not shown so that the value 0 is transmitted as aPlus-value. The switch signal B_VGB_Akt is formed when a deceleration has been detected (aDesLim<aBaseMin) by the limiter or when a limiting of the driver command by the output quantity of the limiter is present. The driver command is derived from the accelerator pedal.

FIG. 6 shows a flowchart which sketches a preferred realization of the distributor 210 while considering the driver command MFW. Input quantities are the driver command torque MFW in addition to the desired values aVRegMix and aVLimMix. The driver command torque MFW is determined from the accelerator pedal value. The output quantity MPT is the resulting command for propulsion torque from the driver functions and the driver command. The quantity aBr identifies the resulting desired deceleration which results from the drive functions. The binary data B_BrEn represents the validity of aBr. In 2101 and 2102, the acceleration desired values aVRegMix and aVLimMix are converted into corresponding transmission output torques with the aid of the drive dynamic equation. The driver command torque MFW and the desired value, which is derived from the desired acceleration value aVRegMix of the controller, are supplied to a maximum value selector 2103. The larger of the two values is selected in the maximum value selector. In this way, an override of the drive speed controller by the driver command is possible.

The result of the maximum value selection is supplied to a minimum value selector 2104 to which also a desired value is supplied derived from the desired acceleration value aVLimMix of the limiter. The smaller of the two values forms the propulsion command MPT. In this way, a limiting of the drive speed controller and the driver command is made possible by the limiter.

The deceleration command aBr is formed by the minimum value selector 2105 from the acceleration desired values of the controller and the limiter. Furthermore, a switch element with hysteresis 2106 is provided. If the determined value of aBr is greater than a limit value, then the validity signal B_BrEn is set and is reset for a drop below a further, lesser limit value. The deceleration is pregiven as (upper) limit value which deceleration is caused by the drag torque of the drive train.

The invention claimed is:

1. A method for controlling the driving speed of a vehicle, the method comprising the steps of:

generating first and second input quantities from first and second functions for influencing the driving speed of the vehicle with said first and second functions being a speed limiting function and a speed control function, respectively;

forming first and second base values for said first and second functions, respectively;

supplying said first and second input quantities and said first and second base values to first and second mixers, respectively, wherein said first input quantity is limited in dependence upon said first base value to form a first output quantity and said second input quantity is limited in dependence upon said second base value to form a second output quantity;

applying said first and second output quantities to a distributor and making a selection therein from said output quantities to form at least one propulsion desired value; and, outputting said at least one propulsion desired value to corresponding control functions for motor, braking system and/or transmission of said vehicle.

2. The method of claim 1, wherein the first and second input quantities are acceleration values and said first and second base values are acceleration base values.

3. The method of claim 2, wherein said first base value indicates a value for which an acceleration of the vehicle takes place via said first output quantity when this first base value is exceeded and said second base value is pregiven which makes possible a deceleration via said second output when there is a drop below this second base value.

4. The method of claim 1, wherein, when a limit value, which is dependent upon the first base value, is exceeded, the input quantity of the speed limiting function is limited to this limit value.

5. The method of claim 1, wherein the input quantity of the speed control function is limited to a limit value which is derived from the second base value.

6. The method of claim 5, wherein the maximum limiting of the input quantity of the speed control function corresponds to the second base value when an active intervention of the speed limiting is present.

7. The method of claim 1, wherein the first and second input quantities, which are limited by said first and second base values, respectively, as may be required, are combined to form a resulting propulsion desired value in said distributor and at least one actuating member is actuated in dependence upon said resulting propulsion desired value.

8. An arrangement for controlling the driving speed of a vehicle, the arrangement comprising:

means for generating first and second input quantities from first and second functions for influencing the driving speed of the vehicle with said first and second functions being a speed limiting function and a speed control function, respectively;

means for forming first and second base values for said first and second functions, respectively;

means for supplying said first and second input quantities and said first and second base values to first and second mixers, respectively, wherein said first input quantity is limited in dependence upon said first base value to form a first output quantity and said second input quantity is limited in dependence upon said second base value to form a second output quantity;

means for applying said first and second output quantities to a distributor wherein a selection is made from said output quantities to form at least one propulsion desired value; and, said distributor outputting said at least one propulsion desired value to corresponding control functions for motor, braking system and/or transmission of said vehicle.

* * * * *